United States Patent
Zhang (10) Patent No.: US 11,250,046 B2
(45) Date of Patent: Feb. 15, 2022

(54) IMAGE VIEWING METHOD AND MOBILE TERMINAL

(71) Applicant: VIVO MOBILE COMMUNICATION CO., LTD., Chang'an Dongguan (CN)

(72) Inventor: Yanni Zhang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 16/757,606

(22) PCT Filed: Oct. 19, 2018

(86) PCT No.: PCT/CN2018/111035
§ 371 (c)(1),
(2) Date: Apr. 20, 2020

(87) PCT Pub. No.: WO2019/076377
PCT Pub. Date: Apr. 25, 2019

(65) Prior Publication Data
US 2020/0327158 A1  Oct. 15, 2020

(30) Foreign Application Priority Data
Oct. 20, 2017 (CN) .......................... 201710984418.4

(51) Int. Cl.
*G06F 16/54* (2019.01)
*G06F 16/51* (2019.01)
(Continued)

(52) U.S. Cl.
CPC .......... *G06F 16/51* (2019.01); *G06F 3/04842* (2013.01); *G06F 16/54* (2019.01); *H04M 1/72427* (2021.01); *H04M 1/72472* (2021.01)

(58) Field of Classification Search
CPC ....... G06F 16/51; G06F 16/54; G06F 3/04842
See application file for complete search history.

(56) References Cited

U.S. PATENT DOCUMENTS 9,465,528 B2 * 10/2016 Jang ..................... G06F 16/44
2004/0201752 A1 * 10/2004 Parulski ............. H04N 1/00188
348/231.99
(Continued)

FOREIGN PATENT DOCUMENTS

CN        103412762 A     11/2013
CN        107241492 A     10/2017
(Continued)

OTHER PUBLICATIONS

Search Report for related European Application No. 18867392.5; report dated Oct. 30, 2020.
(Continued)

*Primary Examiner* — Dino Kujundzic
(74) *Attorney, Agent, or Firm* — von Briesen & Roper, s.c.

(57) ABSTRACT

An image viewing method and a mobile terminal are provided. The method includes: detecting whether a viewing instruction of a user for a display identifier on a target position is received, where the display identifier is a display identifier of a target image selected by the user from an image selection interface; displaying the target image corresponding to the display identifier, in a case that the viewing instruction is received; and jumping to a position where the target image is located in the image selection interface.

20 Claims, 7 Drawing Sheets

(51) Int. Cl.
G06F 3/0484 (2022.01)
H04M 1/72427 (2021.01)
H04M 1/72472 (2021.01)

(56) References Cited

U.S. PATENT DOCUMENTS

| | | | |
|---|---|---|---|
| 2007/0186189 A1* | 8/2007 | Schiller | G06F 16/54 |
| | | | 715/838 |
| 2007/0209025 A1* | 9/2007 | Jing | G06F 16/9038 |
| 2009/0063299 A1* | 3/2009 | Amacker | G06Q 30/0643 |
| | | | 705/26.64 |
| 2009/0070695 A1* | 3/2009 | Oh | G06F 3/0486 |
| | | | 715/769 |
| 2010/0039399 A1* | 2/2010 | Kim | G06F 3/0482 |
| | | | 345/173 |
| 2012/0159379 A1* | 6/2012 | Negrillo | G06F 3/04842 |
| | | | 715/781 |
| 2013/0239060 A1 | 9/2013 | Kang et al. | |
| 2013/0300697 A1 | 11/2013 | Kim et al. | |
| 2014/0129980 A1 | 5/2014 | Lee | |
| 2017/0134605 A1 | 5/2017 | Ju et al. | |

FOREIGN PATENT DOCUMENTS

| | | | |
|---|---|---|---|
| CN | 107247537 A | 10/2017 | |
| CN | 107783709 A | 3/2018 | |
| EP | 2157502 A2 | 2/2010 | |

OTHER PUBLICATIONS

International Search Report & Written Opinion related to Application No. PCT/CN2018/111035; dated Jan. 25, 2019.

* cited by examiner

IMAGE VIEWING METHOD AND MOBILE TERMINAL

CROSS-REFERENCE TO RELATED APPLICATION

This application is the U.S. national phase of PCT Application No. PCT/CN2018/111035 filed on Oct. 19, 2018, which claims a priority to Chinese Patent Application No. 201710984418.4 filed on Oct. 20, 2017, both disclosures of which are incorporated in their entireties by reference herein.

TECHNICAL FIELD

The present disclosure relates to the field of communication technology in particular to an image viewing method and a mobile terminal.

BACKGROUND

With the development of science and technology and the improvement of communication technology, more and more smart terminals or mobile terminals such as smart phones, smart televisions and computers become an indispensable part of people's lives. With the popularity of mobile terminals, users are increasingly demanding the types of functions and performance of the mobile terminals, such as Internet functions, audio functions, video functions, photographing functions, and fast charging functions, which have become essential functions of smart terminals or mobile terminals.

When a user browses images on a mobile terminal, the user needs to select one or more images if the user needs to perform an operation such as sharing or deleting the image(s), and in an image selection manner in the related technology, when an image is selected successfully, there is generally only a feedback about the successful selection, such as ticking or digital display representing the number of the selected image(s). However, when the user browses to another display interface, if the user needs to change the selected image, or the user forgets which image he selected, or views the selected image, the user needs to manually return to the position of the originally selected image, and then the user can view, cancel or change the selected images. Especially, when similar images such as continuous shot images need to be searched on different pages, the user needs to distinguish an image from several images with high similarity, which is not only cumbersome to operate, time-consuming and labor-intensive, but also of a low search accuracy as it is easy to confuse selected images with unselected images.

SUMMARY

An image viewing method is provided by some embodiments of the present disclosure, which is applied to a mobile terminal. The method includes:
 detecting whether a viewing instruction of a user for a display identifier on a target position is received, where the display identifier is a display identifier of a target image selected by the user from an image selection interface;
 displaying the target image corresponding to the display identifier in a case that the viewing instruction is received; and
 jumping to a position where the target image is located in the image selection interface.

A mobile terminal is further provided by some embodiments of the present disclosure. The mobile terminal includes:
 a detection module, configured to detect whether a viewing instruction of a user for a display identifier on a target position is received, where the display identifier is a display identifier of a target image selected by the user from an image selection interface;
 a first display module, configured to display the target image corresponding to the display identifier, in a case that the viewing instruction is received; and
 a jump module, configured to jump to a position where the target image is located in the image selection interface.

A mobile terminal is further provided by some embodiments of the present disclosure. The mobile terminal includes a processor, a memory, and a computer program that is stored on the memory and executable on the processor. The computer program is executed by the processor to implement steps of the above image viewing method.

A computer-readable storage medium is further provided according to embodiments of the present disclosure. A computer program is stored on the computer-readable storage medium, and the computer program is executed by a processor to implement steps of the above image viewing method.

BRIEF DESCRIPTION OF DRAWINGS

In order to more clearly describe technical solutions of embodiments of the present disclosure, the drawings used in the description of the embodiments of the present disclosure will be briefly illustrated below. Obviously, the drawings in the following description are only some embodiments of the present disclosure. For those of ordinary skill in the art, other drawings can be obtained based on these drawings without creative efforts.

DETAILED DESCRIPTION

The technical solutions in embodiments of the present disclosure will be clearly and completely described below with reference to the accompanying drawings in the embodiments of the present disclosure. Obviously, the described embodiments are part of the embodiments of the present disclosure rather than all of the embodiments. Based on the embodiments in the present disclosure, all other embodiments obtained by a person of ordinary skill in the art without creative efforts shall fall within the protection scope of the present disclosure.

Figure 1:
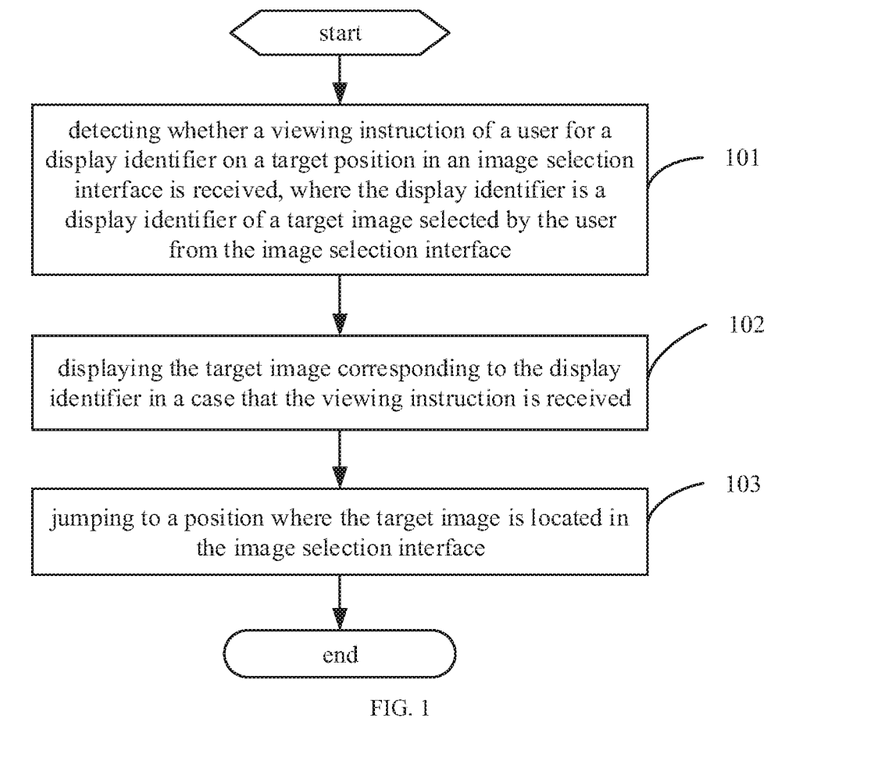
FIG. 1 is a flowchart of an image viewing method provided by an embodiment of the present disclosure.

Referring to FIG. 1, FIG. 1 is a flowchart of an image viewing method provided by an embodiment of the present disclosure. The method is applied to a mobile terminal. As shown in FIG. 1, the method includes the following steps.

Step 101 includes: detecting whether a viewing instruction of a user for a display identifier on a target position is received, where the display identifier is a display identifier of a target image selected by the user from an image selection interface.

In this step, when the target image required by the user is selected by the mobile terminal under a touch operation of the user, and the display identifier of the target image is displayed at the target position on a display screen of the mobile terminal, the mobile terminal may perform detection, especially performing detection in an area where the target position on the display screen of the mobile terminal is located, so as to detect whether the user has operated in the area where the target position is located and whether the viewing instruction of the user for the display identifier of the target image on the target position has been received.

The target image may be a picture file or a video file located in a file collection.

The display identifier is the display identifier of the target image selected by the user from the image selection interface, which may be a thumbnail of the target image, that is, a scaled-down version of the target image, or may be an icon or an identifier that can represent the target image, such as a digital identifier, a text identifier or a specific picture identifier.

The viewing instruction may be a touch operation such as a click operation or a slide operation on the target image by the user on the display screen of the mobile to terminal.

Step 102 includes: displaying the target image corresponding to the display identifier in a case that the viewing instruction is received.

In this step, after the mobile terminal knows that the viewing instruction inputted by the user has been received by detection, the mobile terminal may determine the display identifier selected by the user at the target position according to the viewing instruction, and then may display, based on a preset correspondence between display identifiers and images, the target image corresponding to the display identifier selected by the user on the display screen of the mobile terminal for the user to view.

The displaying the target image corresponding to the display identifier may be displaying the target image at a normal scale, or displaying the enlarged or reduced target image relative to the normal scale according to pre-configuration of the user.

In this way, the mobile terminal can display the target image corresponding to the display identifier for the user to view when the user selects the display identifier, without the user manually searching for the target image for viewing, which is not only simple to operate but also time-saving and effortless for viewing.

Step 103 includes: jumping to a position where the target image is located in the image selection interface.

In this step, when the mobile terminal displays the target image according to the viewing instruction, or after displaying the target image, the mobile terminal may obtain the position of the target image in the image selection interface, that is, a position in the file collection, based on parameter information associated with the display identifier, which is parameter information of the target image, so that the mobile terminal can control the display interface of the mobile terminal to jump to a display interface of the image selection interface where the target image is located, and jump to the position where the target image is located on the display interface, thereby displaying the target image.

The position where the target image is located in the image selection interface may be a position of the target image in the image selection interface when the user selects the target image.

In this way, when displaying the target image corresponding to the display identifier selected by the user, or after displaying the target image corresponding to the display identifier, the mobile terminal can jump to the position in the image selection interface where the target image is located for the user to operate, with no need to manually turn pages by the user to search for the target image, which is not only simple to operate, but also saves time and efforts in viewing. Especially when there are multiple images with high similarity, the user does not need to actively identify and select the images, thus search accuracy is high and it is not easy to confuse.

In embodiments of the present disclosure, the mobile terminal may be any mobile terminal such as a mobile phone, a tablet personal computer, a laptop computer, a personal digital assistant, a mobile Internet device, or a wearable device.

The image viewing method provided by the embodiments of the present disclosure includes: detecting whether a viewing instruction of a user for a display identifier on a target position is received, where the display identifier is a display identifier of a target image selected by the user from an image selection interface; displaying the target image corresponding to the display identifier, in a case that the viewing instruction is received; and jumping to a position in the image selection interface where the target image is located In such a manner, the display identifier of the target image selected by the user from the image selection interface can be displayed at the target position on the display screen of the mobile terminal, and when receiving the viewing instruction of the user, the mobile terminal can directly display the target image based on the display identifier, and jump to the position where the target image is located in the image selection interface, without performing manual operations by the user on the mobile terminal to search for the target image. Even if there are multiple images with high similarity, the user does not need to actively identify and select the images, which is not only simple to operate, time-saving and effortless, but also has a high search accuracy and is not easy to confuse, thereby being conducive to improving the user experience.

Figure 2:
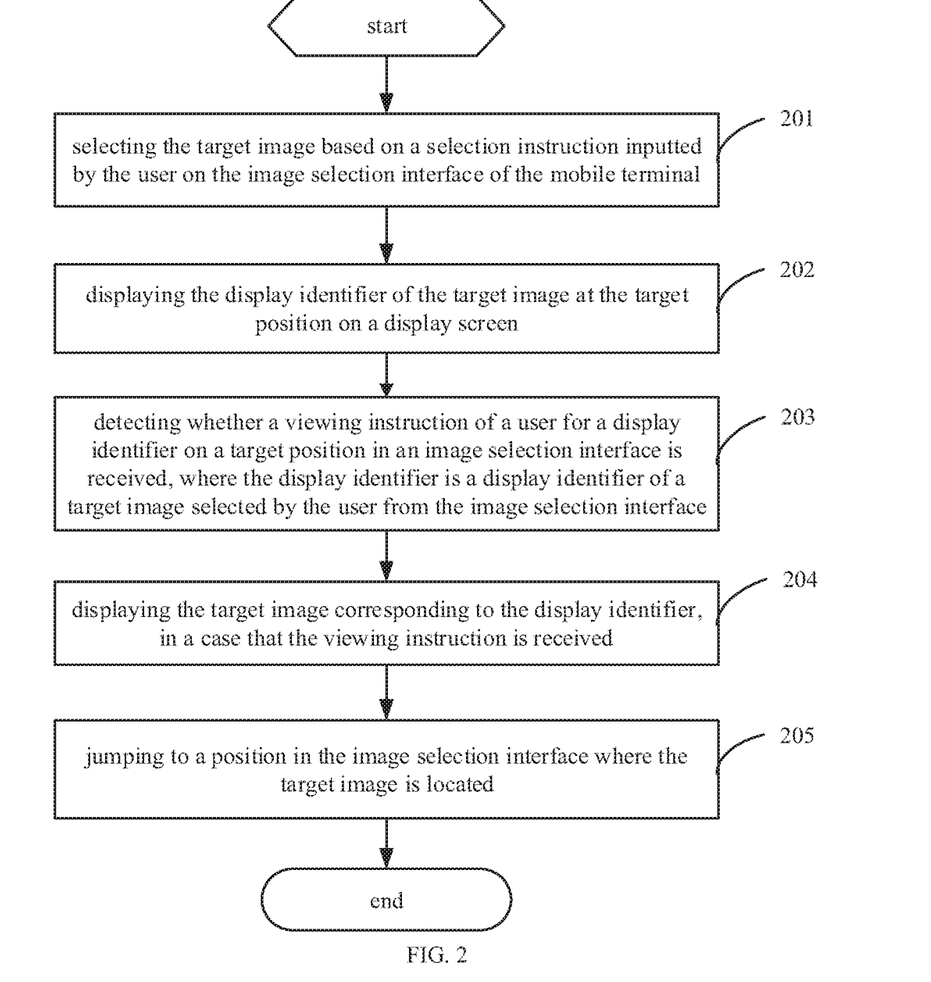
FIG. 2 is a flowchart of an image viewing method provided by another embodiment of the present disclosure.

Referring to FIG. 2, FIG. 2 is a flowchart of an image viewing method provided by another embodiment of the present disclosure. The method is applied to a mobile terminal. As shown in FIG. 2, the method includes the following steps.

Step 201 includes: selecting the target image based on a selection instruction inputted by the user on the image selection interface of the mobile terminal.

In this step, in a case that the user needs to select an image when performing processing such as sorting, deleting or modifying image(s) in a file collection, the mobile terminal may receive a user operation on the image selection interface of the mobile terminal, such as touch operation, and identify the user operation to determine the selection instruction inputted by the user on the image selection interface of the mobile terminal. Then, the mobile terminal may select an image required by the user on the image selection interface according to the selection instruction inputted by the user.

The selection instruction inputted by the user on the image selection interface of the mobile terminal may be a touch operation such as a click operation, a long-press operation, or a slide operation on the image inputted by the user on the image selection interface of the mobile terminal.

Step 202 includes: displaying the display identifier of the target image at the target position on a display screen.

In this step, after the mobile terminal has received the selection instruction of the user and has selected the target image, the mobile terminal may control to generate one display identifier corresponding to the target image, and display the display identifier at the target position on the display screen of the mobile terminal.

The display identifier may be a thumbnail of the target image, that is, a scaled-down version of the target image, or may be an icon or an identifier that can represent the target image, such as a digital identifier, a text identifier or an image identifier of a specific image.

The target position may be a fixed display position divided on the display screen to display the display identifier, such as below or above the display screen, or on the left or right of the display screen, or may be hidden position, which refers to that the target position can be hidden after the display identifier is displayed on the target position, and the target position can be displayed after the user summons or wakes up it through the operation.

In this way, when the user has selected the target image, the display identifier of the target image can be displayed on the target position; and when the user needs to review the selected image, the user can know the selected target image only by viewing the display identifier on the target position, without the need to return to the display interface where the target image is selected through operations such as page turning, which is simple to operate, and saves time and efforts.

Step 203 includes: detecting whether a viewing instruction of a user for a display identifier on a target position is received, where the display identifier is a display identifier of a target image selected by the user from an image selection interface.

Step 204 includes: displaying the target image corresponding to the display identifier, in a case that the viewing instruction is received.

Step 205 includes: jumping to a position in the image selection interface where the target image is located.

For the description of step 203 to step 205, reference can be made to the description of step 101 to step 103 in the foregoing embodiments, and details are not described herein again.

Figure 3A:
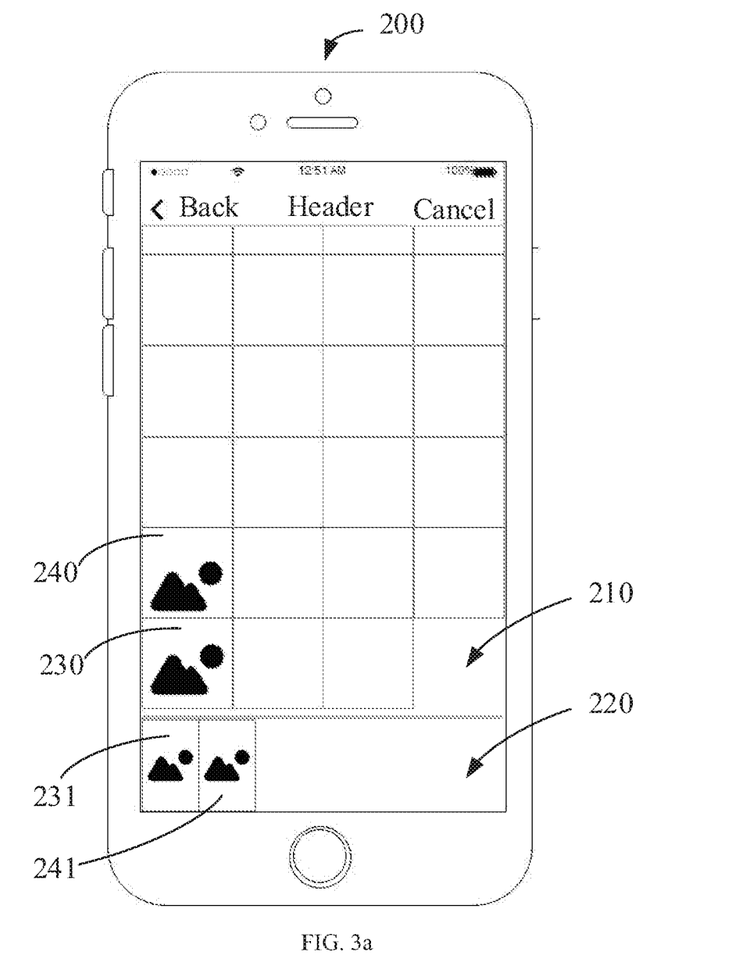
FIG. 3a to FIG. 3c are schematic diagrams showing a process from selecting target images to jumping to a position of one of the target images in an image selection interface.
Figure 3B:
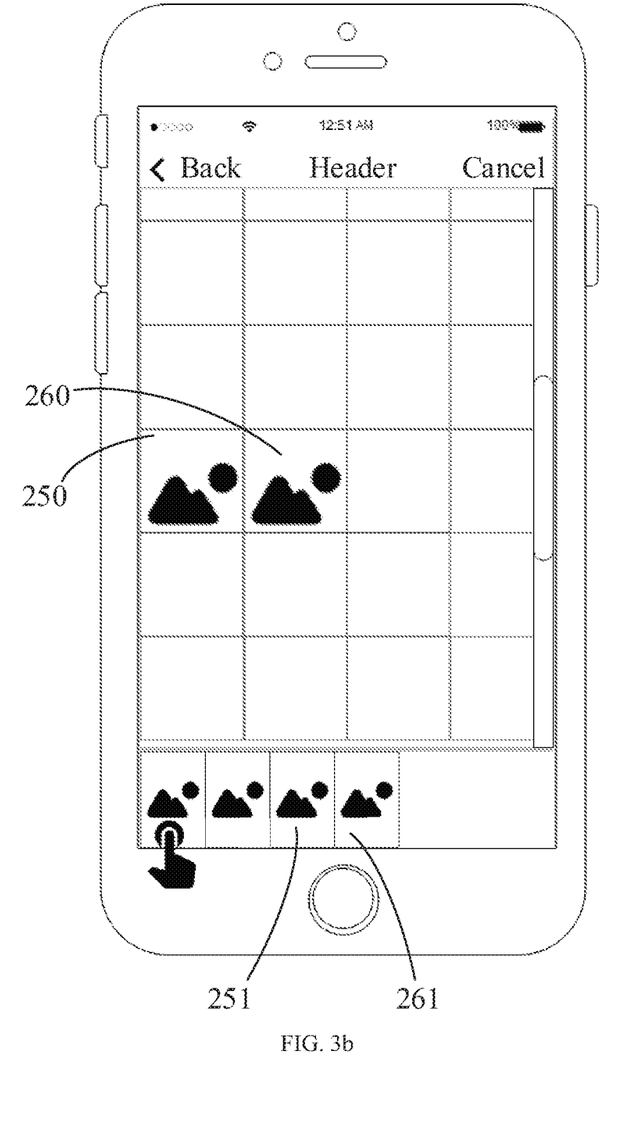
Figure 3C:
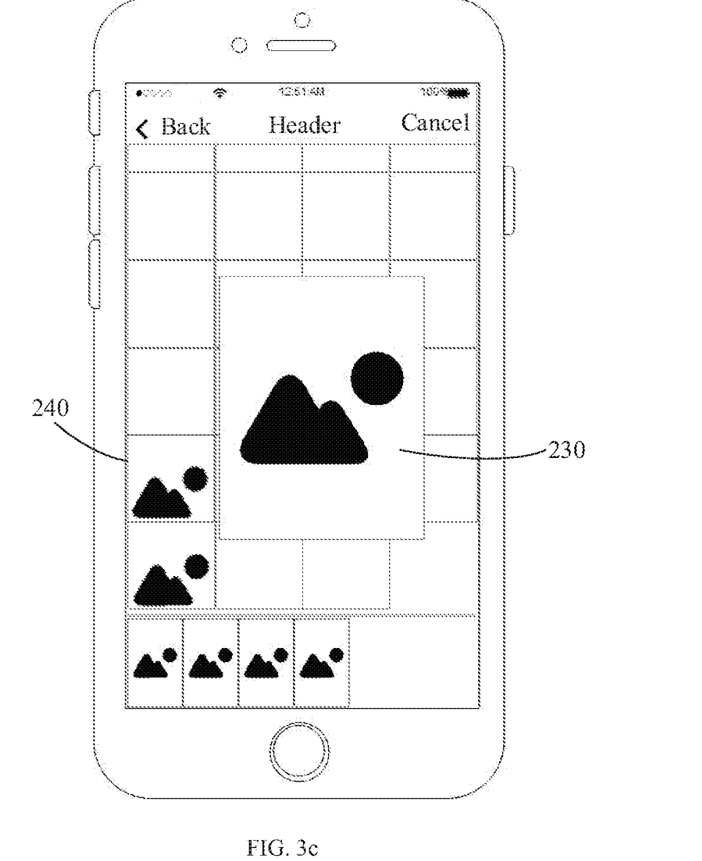

For example, as shown in FIG. 3a to FIG. 3c, FIG. 3a to FIG. 3c are schematic diagrams of a process from selecting target images to jumping to a position of one of the target images in an image selection interface. A mobile terminal 200 may first select a target image 230 and a target image 240 in a certain display page in an image selection interface 210 according to a selection instruction inputted by a user and display a display identifier 231 of the target image 230 and a display identifier 241 of the target image 240 on a target position 220, and then may select a target image 250 and a target image 260 in another page in the image selection interface 210 according to the selection instruction inputted by the user and display a display identifier 251 of the target image 250 and a display identifier 261 of the target image 260 on the target position 220. After the mobile terminal 200 receives an instruction of the user to view the display identifier 231, the mobile terminal 200 can directly display the target image 230 corresponding to the display identifier 231, and enable the display interface of the mobile terminal 200 to jump to a position where the target image 230 is located in the image selection interface 210 when the target image 230 is selected.

Optionally, prior to step 202, the method includes: obtaining an index number of the target image, and position information of the target image when being selected in the image selection interface; and associating the index number and the position information with the display identifier of the target image.

In this step, before the mobile terminal displays the display identifier on the target position by controlling, the mobile terminal may obtain the index number of the target image from the parameter information of the target image by detecting the parameter information of the target image, after the mobile terminal has selected the target image based on the selection instruction of the user; and the mobile terminal may determine the position information of the target image when being selected in the image selection interface through detection when the mobile terminal determines the target image based on the selection instruction. Therefore, when the target image is selected, the mobile terminal can obtain the position information of the target image when being selected in the image selection interface, such as a coordinate of the target image on the display interface when being selected. After the mobile terminal obtains the index number and the position information, the mobile terminal may configure the index number and the position information in data information of the display identifier corresponding to the target image through coding or the like, thereby associating the index number and the position information with the display identifier.

The index number may be a serial number set by default in a system when the target image is stored in the file collection, or may be a serial number set by the user in accordance with the demand, which is not limited herein. For multiple images in the file collection, each image has a unique index number, and when one of the images is deleted or removed from the file collection, subsequent images may be automatically arranged forward, and corresponding indexes of the subsequent images are replaced adaptively to ensure the continuity of the index numbers.

In view of the above, the index number and the position information of the target image are associated with the display identifier of the target image, which can ensure accurate search when the target image is automatically searched subsequently.

Optionally, step 205 includes: determining a display page where the target image is located in the image selection interface based on the index number; determining a position of the target image on the display page based on the position information; and jumping to the position of the target image on the display page.

In this step, when the mobile terminal receives the viewing instruction from the user and displays the target image corresponding to the display identifier, or after the mobile terminal has displayed the target image corresponding to the display identifier, the mobile terminal may extract the index number and the position information associated with the display identifier, and then search for the target image according to the index number, thereby determining a possible range of the display interface where the target image may be located in the image selection interface. Further, after the mobile terminal has determined the possible range of the display interface where the target image may be located in the image selection interface, the mobile terminal may determine a position of the target image on the display interface according to the position information, and may further determine the display interface where the target image is located in the image selection interface according to the position of the target image. After the mobile terminal has determined the display interface where the target image is located in the image selection interface and a position where the target image is located, the mobile terminal can control the display interface to jump to the display interface where the target image is located in the image selection interface, and further jump to the position where the target image is located.

Optionally, subsequent to step 202, the method includes: displaying an order identifier on the display identifier, where the order identifier is an arrangement order of the display identifier at the target position.

In this step, after the mobile terminal controls to display the display identifier on the target position, the mobile terminal may detect the number of a certain kind of display identifiers on the target position and position information of the display identifier in the certain kind of display identifiers, then determine an arrangement order of the display identifier in the certain kind of display identifiers according to the number of the certain kind of display identifiers and the position information of the display identifier in the certain kind of display identifiers, and further display the order identifier of the display identifier on the display identifier.

The order identifier is the arrangement order of the display identifier at the target position.

The image viewing method provided by the embodiments of the present disclosure includes: selecting target image(s) based on selection instructions inputted by a user on an image selection interface of a mobile terminal; displaying display identifier(s) of the target image(s) at a target position on a display screen; detecting whether a viewing instruction of the user for a display identifier of the display identifier(s) on the target position is received, where the display identifier is a display identifier of a target image selected by the user from an image selection interface; displaying the target image corresponding to the display identifier, in a case that the viewing instruction is received; and jumping to a position in the image selection interface where the target image is located. In such a manner, the display identifier of the target image selected by the user from the image selection interface can be displayed at the target position on the display screen of the mobile terminal, and when receiving the viewing instruction of the user, the mobile terminal can directly display the target image based on the display identifier, and jump to the position in the image selection interface where the target image is located, without performing manual operations by the user on the mobile terminal to search for the target image. Even if there are multiple images with high similarity, the user does not need to actively identify and select the images, which is not only simple to operate, time-saving and effortless, but also has a high search accuracy and is not easy to confuse, thereby being conducive to improving the user experience.

Figure 4:
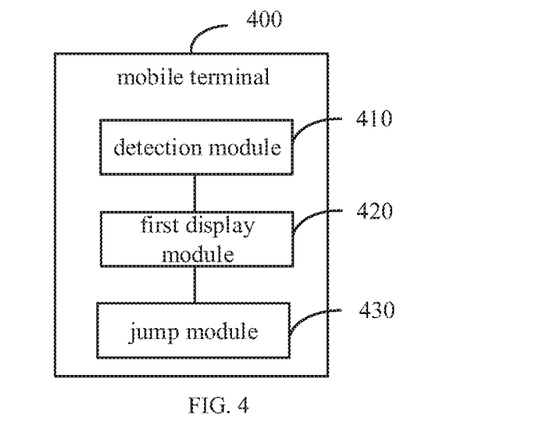
FIG. 4 is a first structural diagram of a mobile terminal provided by an embodiment of the present disclosure.
Figure 5:
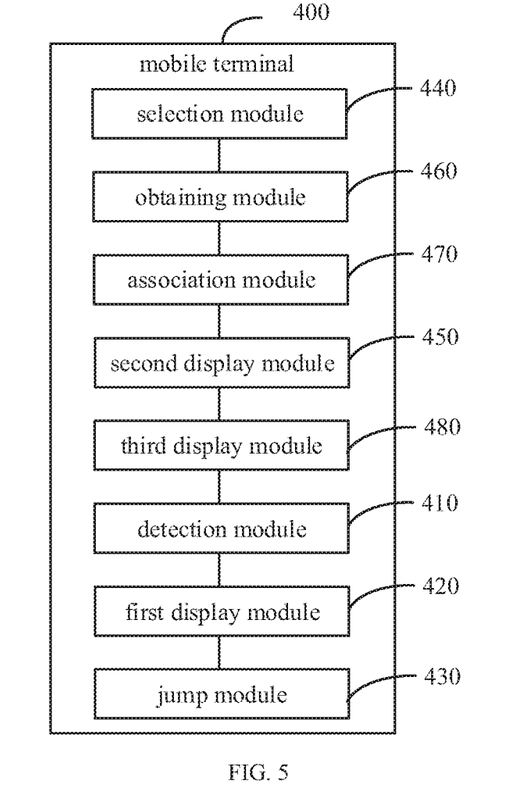
FIG. 5 is a second structural diagram of a mobile terminal provided by an embodiment of the present disclosure.
Figure 6:
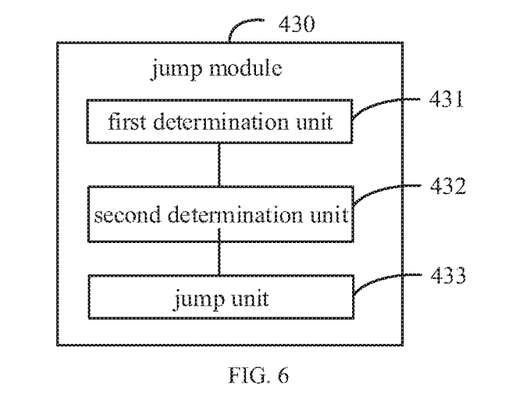
FIG. 6 is a structural diagram of a jump module shown in FIG. 4.

Referring to FIG. 4 to FIG. 6, FIG. 4 is a first structural diagram of a mobile terminal provided by an embodiment of the present disclosure, FIG. 5 is a second structural diagram of a mobile terminal provided by an embodiment of the present disclosure, and FIG. 6 is a structural diagram of a jump module shown in FIG. 4. As shown in FIG. 4, the mobile terminal 400 includes:

a detection module 410, configured to detect whether a viewing instruction of a user for a display identifier on a target position is received, where the display identifier is a display identifier of a target image selected by the user from an image selection interface;

a first display module 420, configured to display the target image corresponding to the display identifier, in a case that the viewing instruction is received; and a jump module 430, configured to jump to a position where the target image is located in the image selection interface.

Optionally, as shown in FIG. 5, the mobile terminal 400 includes: a selection module 440, configured to select the target image based on a selection instruction inputted by the user on a display screen of the mobile terminal 400; and a second display module 450, configured to display the display identifier of the target image at the target position on a display screen.

Optionally, as shown in FIG. 5, the mobile terminal 400 includes: an obtaining module 460, configured to obtain an index number of the target image, and position information of the target image when being selected in the image selection interface; and an association module 470, configured to associate the index number and the position information with the display identifier of the target image.

Optionally, as shown in FIG. 5, the mobile terminal 400 includes: a third display module 480 configured to display an order identifier on the display identifier, where the order identifier is an arrangement order of the display identifier at the target position.

Optionally, as shown in FIG. 6, the jump module 430 includes: a first determination unit 431, configured to determine a display page where the target image is located in the image selection interface based on the index number; a second determination unit 432, configured to determine a position of the target image on the display page based on the position information; and a jump unit 433, configured to jump to the position of the target image on the display page.

The mobile terminal 400 provided by the embodiments of the present disclosure can implement various processes implemented by the mobile terminal in the method embodiments of FIG. 1 and FIG. 2, which are not described herein to avoid repetition.

The mobile terminal provided by the embodiments of the present disclosure detects whether a viewing instruction of a user for a display identifier on a target position is received, where the display identifier is a display identifier of a target image selected by the user from an image selection interface; displays the target image corresponding to the display identifier, in a case that the viewing instruction is received; and jumps to a position in the image selection interface where the target image is located. In such a manner, the display identifier of the target image selected by the user from the image selection interface can be displayed at the target position on the display screen of the mobile terminal, and when receiving the viewing instruction of the user, the mobile terminal can directly display the target image based on the display identifier, and jump to the position in the image selection interface where the target image is located, without performing manual operations by the user on the mobile terminal to search for the target image. Even if there are multiple images with high similarity, the user does not need to actively identify and select the images, which is not only simple to operate, time-saving and effortless, but also has a high search accuracy and is not easy to confuse, thereby being conducive to improving the user experience.

Figure 7:
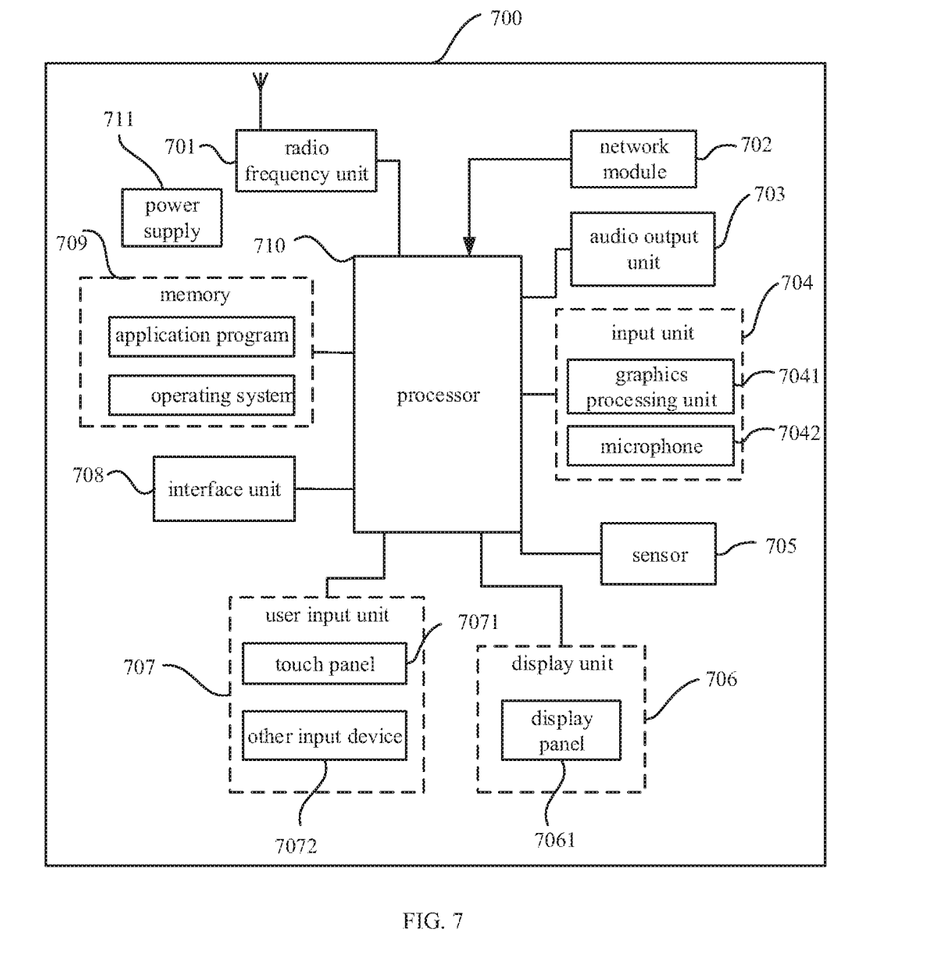
FIG. 7 is a schematic diagram of a hardware structure of a mobile terminal for implementing various embodiments of the present disclosure.

Reference is made to FIG. 7, which is a schematic diagram of a hardware structure of a mobile terminal for implementing various embodiments of the present disclosure. As shown in FIG. 7, the mobile terminal 700 includes but not limited to: a radio frequency unit 701, a network module 702, an audio output unit 703, an input unit 704, a sensor 705, a display unit 706, a user input unit 707, an interface unit 708, a memory 709, a processor 710, a power supply 711 and other components. Those skilled in the art may understand that the structure of the mobile terminal shown in FIG. 7 does not constitute a limitation on the mobile terminal, and the mobile terminal may include more or fewer components than those illustrated in FIG. 7, or combine some of the components, or the components are arranged in a different manner from the illustrated arrangement. In the embodiments of the present disclosure, mobile terminals include but are not limited to mobile phones, tablet computers, notebook computers, palmtop computers, vehicle-mounted terminals, wearable devices, and pedometers.

The processor 710 is configured to detect whether a viewing instruction of a user for a display identifier on a target position is received, where the display identifier is a display identifier of a target image selected by the user from an image selection interface; display the target image corresponding to the display identifier, in a case that the viewing instruction is received; and jump to a position in the image selection interface where the target image is located.

In this way, the display identifier of the target image selected by the user can be displayed at the target position on the display screen of the mobile terminal 700, and upon receipt of the viewing instruction of the user, the mobile terminal 700 can directly display the target image based on the display identifier, and jump to the position in the image selection interface where the target image is located, without performing manual operations by the user on the mobile terminal 700 to search for the target image, Even if there are multiple images with high similarity, the user does not need to actively identify and select the images, which is not only simple to operate, time-saving and effortless, but also has a high search accuracy and is not easy to confuse, thereby being conducive to improving the user experience.

It should be understood that, in the embodiments of the present disclosure, the radio frequency unit 701 may be configured to receive and send information, or to receive and send signals in a call. Specifically, the radio frequency unit 701 delivers downlink information received from a base station to the processor 710 for processing, and transmit uplink data to the base station. Generally, the radio frequency unit 701 includes, but not limited to, an antenna, at least one amplifier, a transceiver, a coupler, a low noise amplifier, a duplexer, or the like. In addition, the radio frequency unit 701 may communicate with a network or other devices via a wireless communication system.

The mobile terminal provides users with wireless broadband Internet access via the network module 702, such as helping users send and receive emails, browse web pages and access streaming media.

The audio output unit 703 may convert audio data received by the radio frequency unit 701 or the network module 702 or stored in the memory 709 into audio signals and output them as sound. Moreover, the audio output unit 703 may provide audio output (for example, call signal reception sound, message reception sound, etc.) related to a specific function performed by the mobile terminal 700. The audio output unit 703 includes a speaker, a buzzer, a receiver, or the like.

The input unit 704 is configured to receive audio or video signals. The input unit 704 may include a graphics processing unit (GPU) 7041 and a microphone 7042. The graphics processor 7041 is configured to process still pictures or image data of videos obtained via an image capture device (such as a camera) in an image capture mode or a video capture mode. The processed image frames may be displayed on the display unit 706. The image frames processed by the graphics processor 7041 may be stored in the memory 709 (or other storage medium) or transmitted via the radio frequency unit 701 or the network module 702. The microphone 7042 may receive sound, and may convert the sound into audio data. The processed audio data may be converted into a format that can be transmitted to a mobile communication base station for outputting via the radio frequency unit 701 in the case of a telephone call mode.

The mobile terminal 700 further includes at least one sensor 705, such as an optical sensor, a motion sensor, or other sensors. Specifically, the optical sensor includes an ambient light sensor and a proximity sensor. The ambient light sensor may adjust brightness of the display panel 7061 according to the brightness of the ambient light, and the proximity sensor may close the display panel 7061 and/or backlight when the mobile terminal 700 approaches to the ear. As a type of motion sensor, an accelerometer sensor may detect the magnitude of acceleration in various directions (usually three-axis directions), and detect the magnitude and direction of gravity when in the stationary state. The accelerometer sensor may be applied to identify the pose of the mobile terminal (such as switching between horizontal screen and vertical screen, a correlated game, and magnetometer pose calibration), a function about vibration recognition (such as pedometer, tapping). The sensor 705 may also include a fingerprint sensor, a pressure sensor, an iris sensor, a molecular sensor, a gyroscope, a barometer, a hygrometer, a thermometer, an infrared sensor, or the like, which are not described herein.

The display unit 706 is configured to display information input by the user or information provided for the user. The display unit 706 may include a display panel 7061. The display panel 7061 may be configured in the form of a liquid crystal display (LCD), an organic light-emitting diode (OLED), or the like.

The user input unit 707 may be configured to receive inputted numeric or character information, and generate key signal inputs related to user settings and function control of the mobile terminal. Specifically, the user input unit 707 includes a touch panel 7071 and other input device 7072. The touch panel 7071, also known as a touch screen, may collect a touch operation of a user thereon or thereby (for example, an operation on or around the touch panel 7071 that is made by a user with a finger, a touch pen or any other suitable object or accessory). The touch panel 7071 may include two parts: a touch detection device and a touch controller. The touch detection device detects touch orientation of the user, detects a signal caused by the touch operation, and transmits the signal to the touch controller. The touch controller receives touch information from the touch detection device, converts the touch information into contact coordinates, and transmits the contact coordinates to the processor 710. The touch controller may receive a command from by the processor 710 and executes the command. In addition, the touch panel 7071 may be implemented by various types such as a resistive panel, a capacitive panel, an infrared panel, or a surface acoustic wave panel. In addition to the touch panel 7071, the user input unit 707 may include other input device 7072. Specifically, the other input device 7072 may include, but not limited to, a physical keyboard, a function key (such as a volume control key, and a switch key), a trackball, a mouse, or a joystick, which are not described herein.

Further, the display panel 7061 may be covered by the touch panel 7071. When the touch panel 7071 detects a touch operation on or near the touch panel 7071, the touch panel 7071 transmits the touch operation to the processor 710 to determine the type of the touch event, and the processor 710 provides a corresponding visual output on the display panel 7061 according to the type of touch event. Although the touch panel 7071 and the display panel 7061 are implemented as two independent components to implement the input and output functions of the mobile terminal in FIG. 7, in some embodiments, the touch panel 7071 and the display panel 7061 may be integrated to implement the input and output functions of the mobile terminal, which are not limited herein.

The interface unit 708 is an interface through which an external device is connected to the mobile terminal 700. For example, the external device may include a wired or wireless headset port, an external power (or battery charger) port, a wired or wireless data port, a memory card port, a port for connecting a device with an identity module, an audio input/output (I/O) port, a video I/O port, a headphone port, etc. The interface unit 708 may be configured to receive input (e.g., data information, power, etc.) from an external device and transmit the received input to one or more elements in the mobile terminal 700, or may be configured to transmit data between the mobile terminal 700 and the external device.

The memory 709 may be configured to store software programs and various data. The memory 709 may mainly include a program storage area and a data storage area, where the program storage area may store an operating system, an application program (such as a sound playback function, an image playback function, etc.) required for at least one function; the data storage area may store data (such as audio data, a phone book, etc.) created according to the use of the mobile phone. In addition, the memory 709 may include a high-speed random access memory, and may further include a non-volatile memory, such as at least one magnetic disk storage device, a flash memory device, or other volatile solid-state storage device.

The processor 710 is a control center of the mobile terminal, which uses various interfaces and lines to connect various parts of the entire mobile terminal. The processor 710 runs or executes software programs and/or modules stored in the memory 709 and calls data stored in the memory 709, to execute various functions of the mobile terminal and process data, so as to monitor the mobile terminal as a whole. The processor 710 may include one or more processing units. Optionally, the processor 710 may integrate an application processor and a modem processor. The application processor mainly processes an operating system, a user interface, an application program, etc., and the modem processor mainly processes wireless communications. It can be understood that the foregoing modem processor may not be integrated into the processor 710.

The mobile terminal 700 may further include a power supply 711 (such as a battery) for supplying power to various components. Optionally, the power supply 711 may be logically connected to the processor 710 through a power management system, so as to implement functions, such as management of charging and discharging, and power consumption management, via the power management system.

In addition, the mobile terminal 700 may include some functional modules that are not shown, which are not described herein again.

Optionally, embodiments of the present disclosure further provide a mobile terminal 700, including a processor 710, a memory 709, and a computer program stored on the memory 709 and executable by the processor 710. When the computer program is executed by the processor 710, the various processes of the above embodiments about the image viewing method are implemented, which can achieve the same technical effects. To avoid repetition, details are not described herein.

Embodiments of the present disclosure further provide a computer-readable storage medium. A computer program is stored on the computer-readable storage medium. When the computer program is executed by a processor, the various processes of the image viewing method in the above embodiments are implemented, which can achieve the same technical effects. To avoid repetition, details are not described herein. The computer-readable storage medium is, for example, a read-only memory (ROM), a random access memory (RAM), a magnetic disk or an optical disk.

It should be noted that, in the present disclosure, the terms "include", "comprise" or any other variants thereof are meant to cover non-exclusive inclusion, so that a process, method, item or apparatus including a series of elements is not limited to those elements, and further includes other elements that are not specifically listed or that are inherent in the process, method, item or apparatus. With no other limitations, an element restricted by the phrase "include a . . . " does not exclude the existence of other identical elements in the process, method, item or apparatus including the element.

Through the descriptions of the above embodiments, those skilled in the art can clearly understand that the methods in the above embodiments can be implemented by means of software plus a necessary universal hardware platform, and also may be implemented by hardware, but in many cases the former is preferred. Based on this understanding, the technical solution of the present disclosure that is essentially or contributes to the conventional technologies can be embodied in the form of a software product that is stored in a storage medium (such as a ROM/RAM, a magnetic disk, or an optical disc), which includes several instructions for enabling a terminal (which may be a mobile phone, a computer, a server, an air conditioner, or a network device) to execute the method described in the embodiments of the present disclosure.

The embodiments of the present disclosure are described above with reference to the accompanying drawings, but the present disclosure is not limited to the specific implementations described above. The specific implementations described above are merely schematic and are not restrictive. Those skilled in the art at the inspiration of the present disclosure can obtain many forms without departing from the principle of the present disclosure and the protection scope of the claims, which shall all fall within the protection of the present disclosure.

What is claimed is:

1. An image viewing method, applied to a mobile terminal, comprising:
    detecting whether a viewing instruction of a user for a display identifier on a target position in a first display page in an image selection interface is received, wherein the display identifier is a display identifier of a target image selected by the user from the first display page of the image selection interface;
    displaying the target image corresponding to the display identifier in a case that the viewing instruction is received; and
    jumping to a position of a second display page where the target image is located in the image selection interface, wherein the first display page and the second display page are different display pages.

2. The method according to claim 1, further comprising:
before detecting whether the viewing instruction of the user for the display identifier on the target position is received,
selecting the target image based on a selection instruction inputted by the user on the image selection interface of the mobile terminal; and
displaying the display identifier of the target image at the target position on a display screen.

3. The method according to claim 2, further comprising:
before displaying the display identifier of the target image at the target position on the display screen,
obtaining an index number of the target image, and position information of the target image when being selected in the image selection interface; and
associating the index number and the position information with the display identifier of the target image.

4. The method according to claim 3, wherein the jumping to the position where the target image is located in the image selection interface comprises:
determining the second display page where the target image is located in the image selection interface based on the index number;
determining a position of the target image on the second display page based on the position information; and
jumping to the position of the target image on the second display page.

5. The method according to claim 3, wherein the associating the index number and the position information with the display identifier of the target image comprises:
configuring the index number and the position information in data information of the display identifier corresponding to the target image through coding.

6. The method according to claim 2, further comprising: displaying an order identifier on the display identifier after displaying the display identifier of the target image at the target position on the display screen, wherein the order identifier is an arrangement order of the display identifier at the target position.

7. The method according to claim 1, wherein the target image is a picture file or a video file located in a file collection.

8. A mobile terminal, comprising:
a processor, a memory, and a computer program that is stored on the memory and executable on the processor, wherein the processor is configured to execute the computer program to:
detect whether a viewing instruction of a user for a display identifier on a target position in a first display page is received, wherein the display identifier is a display identifier of a target image selected by the user from the first display page of an image selection interface;
display the target image corresponding to the display identifier in a case that the viewing instruction is received; and
jump to a position of a second display page where the target image is located in the image selection interface, wherein the first display page and the second display page are different display pages.

9. The mobile terminal according to claim 8, wherein the processor is configured to execute the computer program to:
select the target image based on a selection instruction inputted by the user on the image selection interface of the mobile terminal; and
display the display identifier of the target image at the target position on a display screen.

10. The mobile terminal according to claim 9, wherein the processor is configured to execute the computer program to:

obtain an index number of the target image, and position information of the target image when being selected in the image selection interface; and
associate the index number and the position information with the display identifier of the target image.

11. The mobile terminal according to claim 10, wherein the processor is configured to execute the computer program to:
Determine the second display page where the target image is located in the image selection interface based on the index number;
determine a position of the target image on the second display page based on the position information; and
jump to the position of the target image on the second display page.

12. The mobile terminal according to claim 10, wherein the processor is configured to execute the computer program to:
configure the index number and the position information in data information of the display identifier corresponding to the target image through coding.

13. The mobile terminal according to claim 9, wherein the processor is configured to execute the computer program to:
display an order identifier on the display identifier, wherein the order identifier is an arrangement order of the display identifier at the target position.

14. The mobile terminal according to claim 8, wherein the target image is a picture file or a video file located in a file collection.

15. A non-transitory computer-readable storage medium, wherein a computer program is stored thereon, and the computer program is executed by a processor to:
detect whether a viewing instruction of a user for a display identifier on a target position in a first display page in an image selection interface is received, wherein the display identifier is a display identifier of a target image selected by the user from the first display page of the image selection interface;
display the target image corresponding to the display identifier in a case that the viewing instruction is received; and
jump to a position of a second display page where the target image is located in the image selection interface, wherein the first display page and the second display page are different display pages.

16. The non-transitory computer-readable storage medium according to claim 15, wherein the computer program is executed by the processor to:
select the target image based on a selection instruction inputted by the user on the image selection interface of a mobile terminal; and
display the display identifier of the target image at the target position on a display screen.

17. The non-transitory computer-readable storage medium according to claim 16, wherein the computer program is executed by the processor to:
obtain an index number of the target image, and position information of the target image when being selected in the image selection interface; and
associate the index number and the position information with the display identifier of the target image.

18. The non-transitory computer-readable storage medium according to claim 17, wherein the computer program is executed by the processor to:
determine the second display page where the target image is located in the image selection interface based on the index number;

determine a position of the target image on the second display page based on the position information; and jump to the position of the target image on the second display page.

19. The non-transitory computer-readable storage medium according to claim 17, wherein the computer program is executed by the processor to:

configure the index number and the position information in data information of the display identifier corresponding to the target image through coding.

20. The non-transitory computer-readable storage medium according to claim 16, wherein the computer program is executed by the processor to:

display an order identifier on the display identifier, wherein the order identifier is an arrangement order of the display identifier at the target position.

* * * * *